(12) United States Patent
Kaneko (10) Patent No.: US 9,393,948 B2
(45) Date of Patent: Jul. 19, 2016

(54) VEHICLE START-UP CONTROL MECHANISM

(75) Inventor: Kunihiro Kaneko, Saitama (JP)

(73) Assignee: UD TRUCKS CORPORATION, Ageo-shi (JP)

(*) Notice: Subject to any disclaimer, the term of this patent is extended or adjusted under 35 U.S.C. 154(b) by 173 days.

(21) Appl. No.: 14/348,187

(22) PCT Filed: Aug. 23, 2012

(86) PCT No.: PCT/JP2012/071282
§ 371 (c)(1),
(2), (4) Date: Mar. 28, 2014

(87) PCT Pub. No.: WO2013/077049
PCT Pub. Date: May 30, 2013

(65) Prior Publication Data
US 2014/0249726 A1   Sep. 4, 2014

(30) Foreign Application Priority Data

Nov. 21, 2011   (JP) ................. 2011-253666

(51) Int. Cl.
*B60W 10/02* (2006.01)
*B60W 10/06* (2006.01)
(Continued)

(52) U.S. Cl.
CPC ............. *B60W 10/02* (2013.01); *B60W 10/06* (2013.01); *F02D 29/02* (2013.01); *F02D 41/022* (2013.01);
(Continued)

(58) Field of Classification Search
CPC .............. F16D 48/08; F16D 48/10; F16D 2500/50293; F16D 2500/30415; F16D 2500/50224; F16H 2059/385
See application file for complete search history.

(56) References Cited

U.S. PATENT DOCUMENTS 6,033,341 A * 3/2000 Yamamoto ............ B60W 10/02
477/181
6,148,784 A   11/2000 Masberg et al.
(Continued)

FOREIGN PATENT DOCUMENTS

EP   1566561 A1   8/2005
EP   1762450 A2   3/2007
(Continued)

OTHER PUBLICATIONS

EP1762450 A2 (machine translation)—STORK, Mar. 14, 2007.*
(Continued)

*Primary Examiner* — Jacob S Scott
*Assistant Examiner* — Tinh Dang
(74) *Attorney, Agent, or Firm* — Kratz, Quintos & Hanson, LLP (57) ABSTRACT

An object is to provide a vehicle start-up control, mechanism capable of preventing the occurrence of clutch judder with no need of paying excessive attention thereto for a driver. For this purpose, the present invention is provided with a clutch judder detection device (1) for detecting the occurrence of clutch judder, a clutch state detection, device (3) for detecting a partially engaged clutch state, and a control unit, (10), wherein the control unit (10) has a function, for storing an accelerator opening (position) in the partially engaged clutch state in a case where the clutch judder has occurred during start-up and a function, for comparing an accelerator opening during next start-up with an accelerator opening in case where the clutch judder has occurred during previous start-up.

5 Claims, 4 Drawing Sheets

(51) Int. Cl.
　　*B60W 30/20*　　(2006.01)
　　*F16D 48/08*　　(2006.01)
　　*F16D 48/10*　　(2006.01)
　　*F02D 29/02*　　(2006.01)
　　*F16D 48/02*　　(2006.01)
　　*F02D 41/02*　　(2006.01)
　　*F16D 48/06*　　(2006.01)

(52) U.S. Cl.
　　CPC .............. *F16D 48/02* (2013.01); *F16D 48/06* (2013.01); *B60W 2510/06* (2013.01); *F02D 2200/602* (2013.01); *F16D 2500/3026* (2013.01); *F16D 2500/3061* (2013.01); *F16D 2500/30415* (2013.01); *F16D 2500/50293* (2013.01)

(56) References Cited

U.S. PATENT DOCUMENTS 8,249,786 B2 *　8/2012　Yoshino ................. F16D 48/06
　　　　　　　　　　　　　　　　701/51

2007/0056784 A1 *　3/2007　Joe ........................... B60K 6/48
　　　　　　　　　　　　　　　　180/65.245

FOREIGN PATENT DOCUMENTS

| GB | 2305743 A | 4/1997 |
| JP | H04-210130 | 7/1992 |
| JP | H04-116028 U | 10/1992 |
| JP | H11-325238 | 11/1999 |
| JP | 2006-200640 A1 | 8/2006 |
| JP | 2009-216203 A1 | 9/2009 |
| JP | 2010-196810 A1 | 9/2010 |
| JP | 2011-1973 A1 | 1/2011 |

OTHER PUBLICATIONS

EP1762450 (A2)—Mar. 14, 2007 (STORK, machine translation).*
International Search Report for International Application No. PCT/JP2012/071282 dated Sep. 18, 2012.
Supplementary European Search Report, for the Corresponding EP Application No. 12851600.2, mailed on May 11, 2015.

* cited by examiner

VEHICLE START-UP CONTROL MECHANISM

TECHNICAL FIELD

The present invention relates to control during start-up of a vehicle having a mechanical clutch.

BACKGROUND ART

Also for large-sized vehicles such as a bus and a truck, a vehicle of the type that the operation of a clutch pedal is not needed by automatically controlling a mechanical clutch, that is, a vehicle having an automatic control device for the mechanical clutch is widely spread.

In such a vehicle, the clutch is connected by automatic control with no operation of the clutch pedal by a driver during start-up.

However, there are cases where abnormal vibration (so-called "clutch judder (clutch chatter)") occurs when connecting the clutch by automatic control during start-up (at automatic start-up).

When such clutch judder occurs, it is feared that the driver may have a remarkably uncomfortable feeling and driver fatigue may be increased.

In addition, the clutch is not smoothly connected and thus there is a possibility that, it adversely affects the start-up of the vehicle.

Further, in a case where the clutch judder has occurred, it is feared that, a shock of clutch connection may be increased and there exists a possibility that goods loaded on a truck may be damaged with the shock.

In order to prevent the clutch judder in a vehicle having an automatic control device for a mechanical clutch, for example, a technology for performing control to bring a clutch disc into a "disconnected" state (a connection released state) coping with a variation amount of a speed of a counter shaft in a transmission during start-up is proposed (refer to Patent Literature 1).

Although such the prior art (Patent Literature 1) is useful for clutch judder prevention, it has such a problem that, there are cases where it becomes difficult for a driver who has a habit of making a stepping amount of an accelerator pedal constant during start-up to start, up the vehicle.

In addition in the above-mentioned prior art (Patent Literature 1), there exists such a problem that the driver has to pay attention to the way of stepping the accelerator pedal so as not to induce the clutch judder and thus he becomes excessively nervous during start-up, which may lead to an increase in driver fatigue.

CITATION LIST

Patent Literature

Patent Literature 1 Japanese Utility Model Application Non-examined Publication Gazette No. H4-116028 (JPA H4-116028)

SUMMARY OF INVENTION

Problem to be Solved by Invention

The present invention has been made in view of the above-mentioned problems of the prior art and an object thereof is to provide a vehicle start-up control mechanism capable of preventing the occurrence of clutch judder with no need of paying excessive attention thereto for a driver.

Solution to Problem

A vehicle start-up control mechanism according to the present invention is characterized by being provided with
a clutch judder detection device (1) for detecting the occurrence of clutch judder,
(an accelerator opening (position) measurement device (4) for measuring an accelerator opening,)
a clutch state detection device (9) for detecting a partially engaged clutch state, and
a control unit (10), wherein
the control unit (10) has a function for storing (by a storage means (30)) an accelerator opening in a partially engaged clutch state in a case where the clutch judder has occurred during start-up (by a judder occurrence determination means (28)), a function for comparing an accelerator opening during next start-up with an accelerator opening in a case where the clutch judder has occurred during previous start-up (by a comparing means (32)) and a function for changing the accelerator opening/position (by a predetermined accelerator opening $\pm\Delta$) during the next start-up (by an accelerator opening signal generation means (34)) when the accelerator opening during the next start-up is the same as said accelerator opening during start-up in a case where the clutch judder has occurred.

In the present invention, it can be constructed such that said clutch judder detection device (1) includes an input, shaft speed measurement device (2) for measuring an input shaft speed (of a transmission), a clutch stroke measurement device (3) for measuring a clutch stroke, and a control unit (the above-mentioned control unit: the control unit (10) according to claim 1), and
the control unit (10) has a function for calculating a variation amount of the input shaft speed (by an input shaft speed variation amount determination means (24)), a function for calculating a variation amount of the clutch stroke (by a clutch stroke variation amount determination means (26)) and a function for deciding that the clutch judder is occurring when the variation amount of the input shaft speed is more than or equal to a threshold value or the variation amount of the clutch stroke is more than or equal to a threshold value (by a judder occurrence determination means (28)).

Here, the threshold value of the input shaft speed variation amount is set case by case depending on vehicle specifications and other conditions.

In addition, the threshold value of the clutch stroke is also set case by case depending on the vehicle specifications and other conditions.

Further, said input, shaft speed measurement device (2) can be constructed by a speed sensor for directly measuring the speed of the input shaft. Or, said input shaft speed measurement device may be constructed by a speed sensor for measuring a speed of a propeller shaft, a device for measuring a gear ratio of the transmission, and a control unit (the above-mentioned control unit: the control unit according to claim 1) having a function for calculating the input shaft speed from the speed of the propeller shaft and the gear ratio.

Then, it is preferable that said clutch state detection device (9) have said clutch stroke measurement device (3), a device (5) for measuring the gear ratio of the transmission, said measurement, device (4), and said input shaft speed measurement device (2).

Further, in the present invention, when biasing the accelerator opening (by the predetermined accelerator opening ±Δ) during next, start-up, it is preferable to increase the accelerator opening (an accelerator stepping direction: +Δ). This is because an operation in the accelerator stepping direction does not provide a driver of a feeling of strangeness as the operation done during start-up rather than others.

However, in a case where the accelerator opening is already in a near 100% state upon the occurrence of the clutch judder, it is preferable to reduce the accelerator opening (−Δ).

Advantageous Effects of Invention

According to the present invention having the above-mentioned configuration, the accelerator opening in the partially engaged clutch state in a case where it has been decided that the clutch judder has occurred (by the judder occurrence determination means (28)) when start-up has been performed before (during start-up before next start-up) is stored (by the storage means (30)), comparison can be made (by a comparing means (32)) as to whether the accelerator opening is the same as the accelerator opening upon the occurrence of the clutch judder during start-up (during the next start-up) after the occurrence of the clutch judder. Then, when the accelerator opening is the same as the accelerator opening upon the occurrence of the clutch judder, it is decided that it is in a state that the clutch judder is liable to occur and the accelerator opening is changed by the predetermined accelerator opening ±Δ (by the accelerator opening signal generation means (34)) so as to bring it into a state that the clutch judder is not liable to occur.

Accordingly, even when the driver has a tendency (the so-called habit) to set to such an accelerator opening that the clutch judder is liable to occur as for the operation, the accelerator opening is set to be out of a region that the clutch judder is liable to occur and the occurrence of the clutch judder can be prevented.

Then, since the occurrence of the clutch judder becomes difficult, the clutch is smoothly connected and does not adversely affect the start-up of the vehicle. In addition, the driver can be prevented from feeling uncomfortable during start-up and the driver fatigue can be reduced. Further, since the occurrence of the clutch judder becomes difficult and an increase in shock upon connection of the clutch is prevented, the goods loaded on the truck can be prevented from being damaged with the shock upon connection of the clutch.

In addition to this, there is no fear even for the driver who has the habit of making the stepping amount, of the accelerator pedal constant, during start-up that start-up may become impossible due to the clutch judder. Therefore, there is no need for the driver to pay attention more than needed to the way of stepping the accelerator pedal, no extra work is needed during start-up, and an increase in fatigue is not induced.

DESCRIPTION OF EMBODIMENTS

In the following, an embodiment of the present invention will be described with reference to the appended drawings.

First, a configuration of a start-up control mechanism according to the embodiment of the present invention will be described with reference to FIG. 1.

Figure 1:
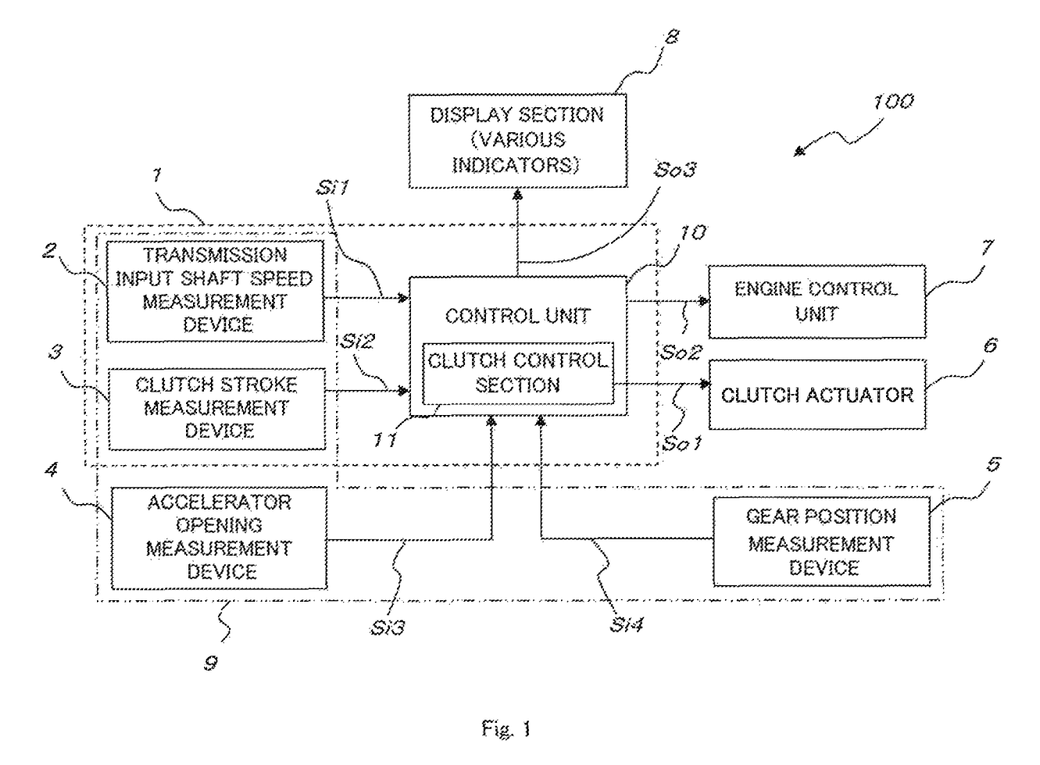
FIG. 1 is a block diagram of an embodiment of the present invention.

In FIG. 1, the start-up control mechanism generally denoted by the numeral 100 is equipped with the clutch judder detection device 1, the clutch state detection device 9 for detecting a partially engaged clutch state, a clutch actuator 6, an engine control unit 7, a display section 8, and the control unit 10 which is a control means.

In FIG. 1, the clutch judder detection device 1 is constructed by the transmission input shaft speed measurement device 2, the clutch stroke measurement device 3 (hereinafter, referred to as a "clutch stroke sensor"), and the control unit 10.

The control unit 10 has a clutch control section 11. Here, the control unit 10 constructes a part of the start-up control mechanism 100 and also constructes a part of the clutch judder detection device 1. Incidentally, the control unit 10 is also shown in FIG. 10.

The clutch state detection device 9 has the input shaft speed measurement device 2, the clutch stroke measurement device 3, the accelerator opening measurement device 4 (an accelerator opening sensor), and the device 5 (a gear position sensor) for measuring the gear ratio of the transmission.

The display section 8 comprehensively expresses various indictors and is equipped with, for example, a position lamp for each gear, and an indicator for caution upon the occurrence of the clutch judder though not clearly shown in FIG. 1.

The transmission input shaft speed measurement device 2 is connected with the control unit 10 via an input signal line Si1 and has a function for transmitting information on input shaft speed, to the control unit 10.

The clutch stroke sensor 3 is connected with the control unit 10 via an input signal line Si2 and is constructed to transmit information on clutch stroke to the control unit 10.

The accelerator opening sensor 4 is connected with the control unit 10 via an input signal line Si3 and has a function for transmitting information on accelerator opening to the control unit 10.

The gear position sensor 5 is connected with the control unit 10 via an input signal line Si4 and is constructed to transmit information on current gear position to the control unit 10.

The control unit 10 is connected with the clutch actuator 6 via a control signal line So1.

Then, the control unit 10 is connected with the engine control unit 7 via a control signal line So2.

Further, the control unit 10 is connected with the display section 8 via a control signal line So3.

The control unit 10 will be described with reference to FIG. 2 to FIG. 4.

As described later with reference to FIG. 2 and FIG. 4, the control unit 10 has the function for storing the accelerator opening in the partially engaged clutch state into the storage means 30 (refer to FIG. 4: not shown in FIG. 1) in a case where clutch judder has occurred during start-up.

In addition, as described later with reference to FIG. 3 and FIG. 4, the control unit 10 has the function for comparing the accelerator opening during next start-up (during start-up after the accelerator opening in the partially engaged clutch state has been stored into the storage means) with the accelerator opening during previous start-up, that is, the accelerator opening that the clutch judder has occurred by the comparing means 32 (refer to FIG. 4).

Further, as described later with reference to FIG. 3, the control unit 10 has the function for changing the accelerator opening during the next start-up (by the predetermined accelerator opening ±Δ) by the accelerator opening signal generation means 34 when the accelerator opening during the next start-up is the accelerator opening upon the occurrence of said clutch judder (refer to FIG. 4).

As described later with reference to FIG. 2, the control unit 10 configuring the clutch judder detection device 1 has the function for calculating the variation amount of the input shaft speed by the input, shaft speed variation amount determination means 24 (refer to FIG. 4) and a timer T, the function for calculating the variation amount, of the clutch stroke by the clutch stroke variation amount determination means 26 (refer to FIG. 4) and the timer T, and the function for deciding that the clutch judder is occurring by the judder occurrence determination means 23 (refer to FIG. 4) when the variation amount of the input shaft speed is more than or equal to the threshold value or the variation amount of the clutch stroke is more than or equal to the threshold value.

Here, the threshold value of the input shaft speed is set case by case depending on the vehicle specifications and other conditions.

In addition, the threshold value of the clutch stroke is also set case by case depending on the vehicle specifications and other conditions.

The input shaft speed, measurement device 2 can be constructed by a speed sensor for directly measuring the speed of the input shaft. Or, it is also possible to construct the input shaft speed measurement device by the speed sensor for measuring the speed of the propeller shaft, the device for measuring the gear ratio of the transmission, and the control unit (the above-mentioned control unit 10) having the function for calculating the input shaft speed from the speed of the propeller shaft, and the gear ratio.

In the shown embodiment, when biasing the accelerator opening (by the predetermined accelerator opening ±Δ) during next start-up (during start-up after the accelerator opening in the partially engaged clutch state has been stored into the storage means), it is preferable to increase the accelerator opening (the accelerator stepping direction: +Δ). This is because the operation in the accelerator stepping direction does not provide the driver of the feeling of strangeness as the operation done during start-up rather than others.

However, in a case where the accelerator opening is already in the near 100% state upon the occurrence of the clutch judder, it is rather preferable to reduce (−Δ) the accelerator opening.

The control unit 10 will be further described with reference to FIG. 4.

Figure 4:
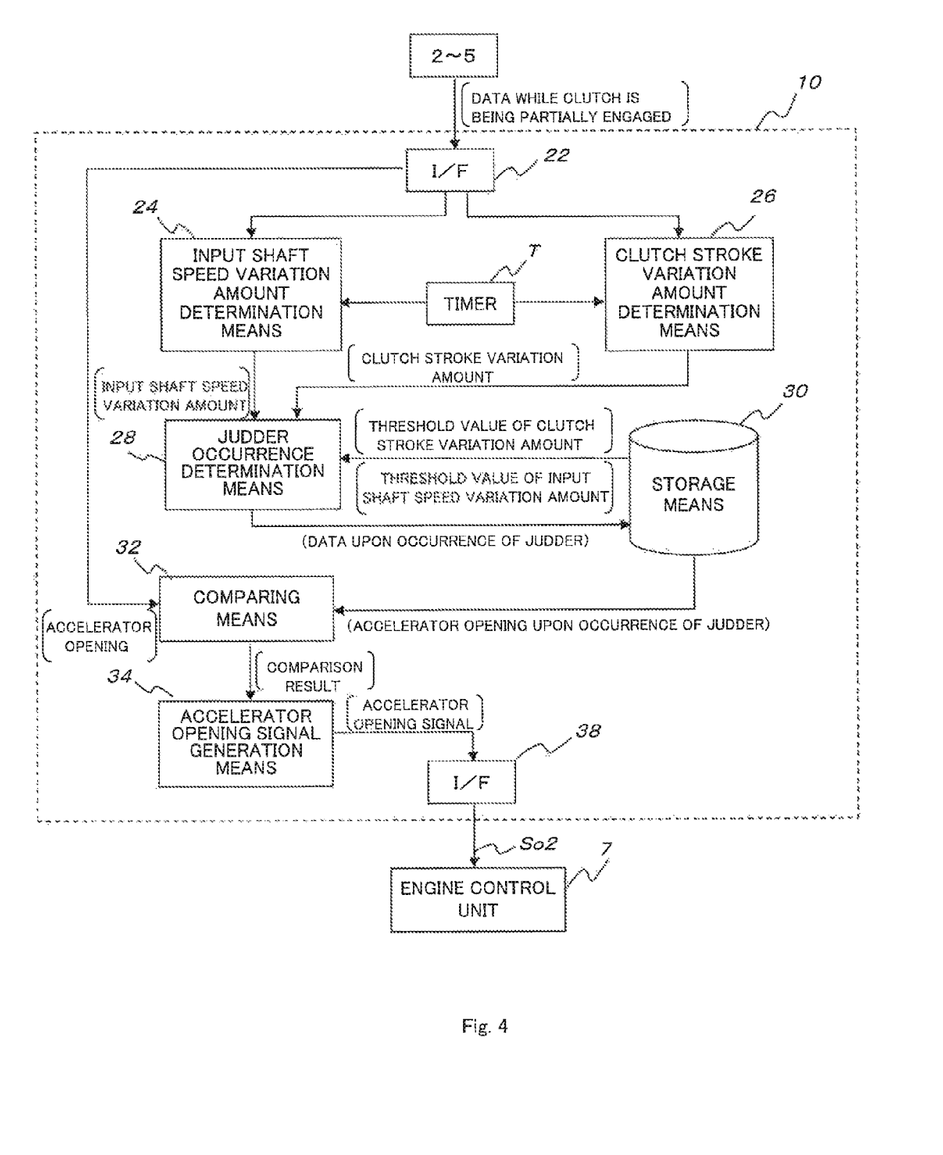
FIG. 4 is a functional block diagram of a control unit in the embodiment.

The control unit generally denoted by the numeral 10 in FIG. 4 is equipped with interfaces 22, 33, the input shaft speed variation amount determination means 24, the clutch stroke variation amount determination means 26, the timer T (a timing means), the judder occurrence determination means 28, the storage means 30, the comparing means 32, and the accelerator opening signal generation means 34.

Measurement signals from the input shaft speed measurement device 2, the clutch stroke measurement device 3, the accelerator opening measurement device 4 (the accelerator opening sensor) and the gear position sensor 5 (the device for measuring the gear ratio of the transmission) are transmitted to the input-side interface 22.

An input result of measurement (the input shaft speed) by the input shaft speed measurement device 2 is transmitted to the input shaft speed variation amount determination means 24 and the input shaft, speed variation amount is arithmetically operated together with a time-passing signal from the timer T. The arithmetically operated input shaft, speed variation amount is transmitted to the judder occurrence determination means 28.

In addition, an input result of measurement (the clutch stroke) by the clutch stroke measurement device 3 is transmitted to the clutch stroke variation amount determination means 26 and the clutch stroke variation amount is arithmetically operated together with a time-passing signal from the timer T. The arithmetically operated clutch stroke variation amount is transmitted to the judder occurrence determination means 28.

The threshold value of the input shaft speed variation amount and the threshold value of the clutch stroke variation amount are transmitted from the storage means 30 to the judder occurrence determination means 28. Then, in the judder occurrence determination means 26, the input shaft speed variation amount is compared with the threshold value and the clutch stroke variation amount is compared with the threshold value.

The judder occurrence determination means 28 has the function for deciding that, the clutch judder has occurred when the variation amount of the input shaft sped is more than or equal to the threshold value, or the variation amount of the clutch stroke is more than or equal to the threshold value. Then, the judder occurrence determination means 28 has a function for transmitting data (a clutch stroke, an accelerator opening, a gear position, an input-shaft speed and so forth when the clutch judder is occurring) upon the occurrence of the clutch judder to the storage means 30 in a case where it has decided that the clutch judder has occurred.

A result of measurement (the accelerator opening) by the accelerator opening sensor 4 and the accelerator opening when the clutch judder has occurred before are transmitted to the comparing means 32. The accelerator opening when the clutch judder has occurred before is sent, from the storage means 30 to the comparing means 32.

The comparing means 32 compares the result, of measurement (the next-time accelerator opening) by the accelerator opening sensor 4 with the accelerator opening when the clutch judder has occurred before. Here, start-up control after the clutch judder has occurred and the data has been stored into the storage means 30 is "next-time start-up control".

A result of comparison by the comparing means 32 is sent to the accelerator opening signal generation means 34. Then, it has a function for deciding that the possibility of the occurrence of the clutch judder is large and transmitting (changing the accelerator opening by ±Δ) a signal that ±Δ is added to an accelerator opening signal to be transmitted to the engine control unit 7 via the control signal line So2 in a case where the result (the next-time accelerator opening) of measurement by the accelerator opening sensor 4 is equal to the accelerator opening when the clutch judder has occurred before.

Next, control for deciding whether the clutch judder has occurred will be described with reference to FIG. 2 and FIG. 4.

Incidentally, with respect to time for performing the control which will be described with reference to FIG. 2, there is no particular limitation.

Figure 2:
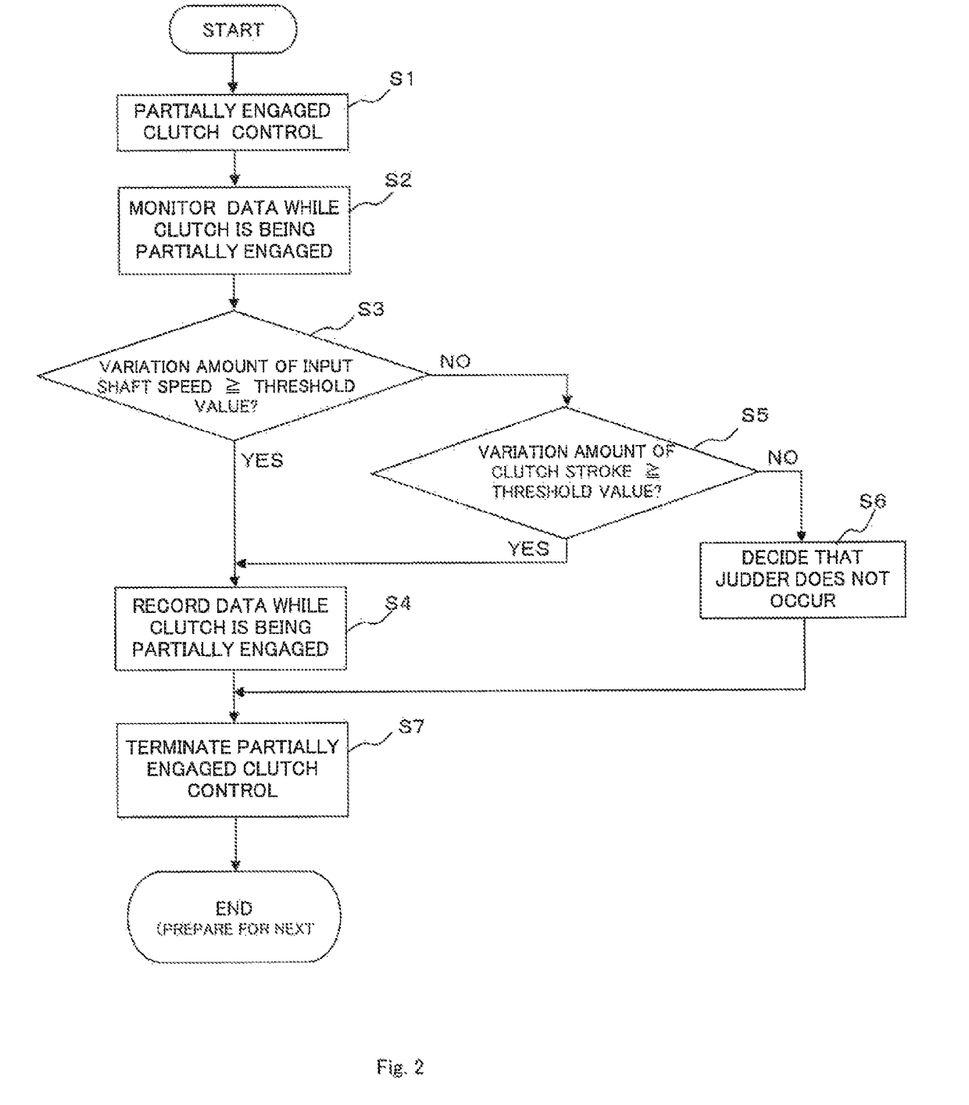
FIG. 2 is a flowchart of control for deciding occurrence/non-occurrence of clutch judder in the embodiment.

In FIG. 2, after an engine has been started, a partially engaged clutch control is performed by automatic control in step S1. In succeeding step S2, various pieces of data (for example, the clutch stroke, the accelerator opening, the gear position, the input shaft speed) while the clutch is being partially engaged are monitored.

Proceeding to step S3, the judder occurrence determination means 28 of the control unit 10 decides whether the variation amount of the input shaft speed of the transmission is more than or equal to the threshold value. When the variation amount of the input shaft speed is more than or equal to the threshold value (YES in step S3), it proceeds to step S4. On the other hand, when the variation amount of the input shaft speed is less than the threshold value (NO in step S3), it proceeds to step S5.

In step S3, the judder occurrence determination means 28 of the control unit 10 decides whether the variation amount of the clutch stroke is more than or equal to the threshold value. When the variation amount of the clutch stroke is more than or equal to the threshold value (YES in step S5), it proceeds to step S4. On the other hand, when the variation amount of the clutch stroke is less than the threshold value (NO in step S5), it proceeds to step S6.

In step S4, the judder occurrence determination means 28 decides chat the clutch judder has occurred. That is, in the shown embodiment, when the variation amount of the input shaft speed is more than or equal to the threshold value, or the variation amount of the clutch stroke is more than or equal to the threshold value, the judder occurrence determination means 28 decides that the clutch judder has occurred.

Then, the judder occurrence determination means 28 transmits data (the data which has been monitored in step S2: the clutch stroke, the accelerator opening, the gear position, the input shaft speed and so forth when the clutch judder is occurring) while the clutch is being partially engaged, at the time of deciding that the clutch judder has occurred to the storage means 30 (refer to FIG. 4) of the control unit 10 to be stored therein. Then, it proceeds to step S7.

On the other hand, in step S6, the control, unit 10 decides that clutch judder does not occur and proceeds up to step S7. That is, in a case where the variation amount of the clutch stroke is less than the threshold value and the variation amount of the clutch stroke is less than the threshold value, the judder occurrence determination means 28 decides that the clutch judder does not occur.

In step S7, the partially engaged clutch control is terminated.

It is also possible for the judder occurrence determination means 28 to decide whether the variation amount of the clutch stroke is more than or equal to the threshold value, first, in step S5 and to decide whether the variation amount of the input shaft speed of the transmission is more than or equal to the threshold value in step S3 in a case where the variation amount, of the clutch stroke is less than the threshold value (NO in step S5) reversely to that shown in FIG. 2.

Or, simultaneously deciding step S3 and step S5, in a case where the variation amount of the clutch stroke is less than the threshold, value and the variation amount of the clutch stroke is less than the threshold value, it may be decided that, clutch judder does not occur, and in a case where the variation amount of the clutch stroke is more than or equal to the threshold value or the variation amount of the clutch stroke is more than or equal to the threshold value, it may be decided that the clutch judder is occurring.

Next, a start-up control (next-time start-up control: a partially engaged clutch control) after the data has been stored in a case where the clutch judder has occurred in FIG. 2 will be described on the basis of FIG. 3.

Figure 3:
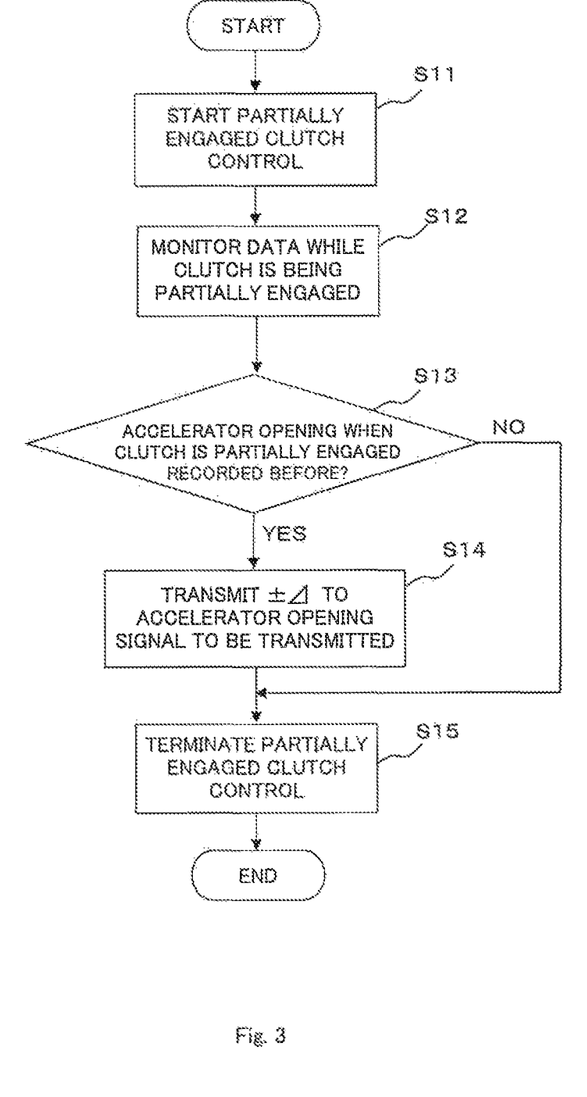
FIG. 3 is a flowchart showing control in case of occurrence of the clutch judder in the embodiment.

In FIG. 3, first, the engine is started and a partially engaged, clutch control is performed in step S11 by automatic control. In succeeding step S12, the data (the clutch stroke, the accelerator opening, the gear position, the input shaft speed and so forth) while the clutch is being partially engaged is monitored.

Proceeding to step S13, whether the accelerator opening in the partially engaged clutch state at that time is the accelerator opening (the accelerator opening when clutch judder has occurred before) stored in a not shown storage means built into the control unit 10 is decided by the comparing means 32 of the control unit 10.

If the accelerator opening in the partially engaged clutch state at that time is stored in the storage means as the accelerator opening in a case where the clutch judder has occurred before (YES in step S13), it will proceed to step S14.

On the other hand, if the accelerator opening in the partially engaged clutch state at that time is not stored in the storage means as the accelerator opening in a case where the clutch judder has occurred before (NO in step S13), it will proceed up to step S15, deciding that the possibility of the occurrence of clutch judder is small.

In step S14, the control unit, 10 decides that the possibility of the occurrence of clutch judder is large, and the signal that ±Δ is added to the accelerator opening signal to be transmitted to the engine control unit 7 is transmitted from the accelerator opening signal generation means 34 via the control signal line So2. Then, it proceeds to step S15. That is, a process of changing the accelerator opening by ±Δ is performed on the accelerator opening so monitored at that time by the accelerator opening signal generation means 34.

Here as ±Δ which is a value (a correction value) to be corrected by the accelerator opening signal generation means 34, the one which increases the accelerator opening large (the accelerator stepping direction: +Δ) is more preferable. This is because the operation in the accelerator stepping direction does not provide the driver of the feeling of strangeness as the operation done during start-up rather than others.

However, in a case where the accelerator opening is already in the near 100% state upon the occurrence of clutch judder (for example, in a case where the indicator (the lamp) for caution flickers), it is rather preferable to reduce (−Δ) the accelerator opening.

Incidentally, ±Δ which is the correction value is determined case by case depending on the vehicle specifications and other conditions. In other words, it is not limited to a specific numerical value.

According to the shown embodiment, the condition (in particular, the accelerator opening) in the partially engaged clutch state when the clutch judder has occurred is stored by the control described in FIG. 2. Comparison is made as to whether the accelerator opening is the same as the accelerator opening when the clutch judder has occurred during subsequent start-up (during next start-up) as described in FIG. 3. Then, when the accelerator opening is the same as the accelerator opening which has been stored in FIG. 2 in a case where the clutch judder has occurred, it is decided that it is in a state where the clutch judder is liable to occur and it is corrected by the predetermined accelerator opening ±Δ so as to change from the state where the clutch judder is liable to occur.

As a result, even when the driver has the tendency (the habit) to set it to the accelerator opening that the clutch judder is liable to occur in the partially engaged clutch state, the occurrence of the clutch judder can be prevented by correcting the accelerator opening so as to be out of the region that, the clutch judder is liable to occur.

It is to be noted that the shown embodiment is merely an illustrative example and it is not the description of the effect that the technical scope of the present invention is limited.

DESCRIPTION OF REFERENCE NUMERALS OR SYMBOLS

1 . . . clutch judder detection device
2 . . . transmission input speed measurement means 3 . . . clutch stroke measurement device/clutch stroke sensor
4 . . . accelerator opening measurement device/accelerator opening sensor
5 . . . gear position measurement device/gear position sensor
6 . . . clutch actuator
7 . . . engine control unit
8 . . . display section
10 . . . control unit

The invention claimed is:

1. A vehicle start-up control mechanism, comprising:
a clutch judder detection device for detecting the occurrence of clutch judder;
a clutch state detection device for detecting a partially engaged clutch state; and
a control unit, wherein
the control unit has a function for storing an accelerator opening in the partially engaged clutch state in a case where the clutch judder has occurred during each start-up, a function for comparing the accelerator opening during next start-up with the accelerator opening in a case where the clutch judder has occurred during previous start-up, and a function for increasing or reducing the accelerator opening during the next start-up when the accelerator opening during the next start-up is the same as said accelerator opening during start-up in a case where the clutch judder has occurred.

2. The vehicle start-up control mechanism according to claim 1, wherein
the clutch judder detection device includes an input shaft speed measurement device for measuring an input shaft speed, a clutch stroke measurement device for measuring a clutch stroke and the control unit, and
the control unit has a function for calculating a variation amount of the input shaft speed, a function for calculating a variation amount of the clutch stroke, and a function for deciding that the clutch judder is occurring when the variation amount of the input shaft speed is more than or equal to a first threshold value or when the variation amount of the clutch stroke is more than or equal to a second threshold value.

3. The vehicle start-up control mechanism according to claim 1, wherein
the clutch state detection device includes a clutch stroke measurement device for measuring a clutch stroke, a device for measuring a gear ratio of a transmission, an accelerator opening measurement device and an input shaft speed measurement device for measuring an input shaft speed.

4. The vehicle start-up control mechanism according to claim 2, wherein
the clutch state detection device includes the clutch stroke measurement device for measuring a clutch stroke, a device for measuring a gear ratio of a transmission, an accelerator opening measurement device and the input shaft speed measurement device for measuring an input shaft speed.

5. The vehicle start-up control mechanism according to claim 1, wherein
the control unit has a function for reducing the accelerator opening in a case where the accelerator opening is already in the near 100% state upon the occurrence of the clutch judder.

* * * * *